US006126337A

United States Patent [19]

Gates et al.

[11] Patent Number: 6,126,337

[45] Date of Patent: Oct. 3, 2000

[54] KIT FOR USE WITH A PHOTOGRAPHIC PROCESSOR

[75] Inventors: Edgar P. Gates, Honeoye; Daniel Davis; Ralph L. Piccinino, Jr., both of Rush; Keith S. Lundy, Spencerport; Mark M. Kerns; Michael R. Gray, both of Rochester, all of N.Y.

[73] Assignee: Eastman Kodak Company, Rochester, N.Y.

[21] Appl. No.: 09/163,215

[22] Filed: Sep. 29, 1998

[51] Int. Cl.[7] ............................ G03D 13/00; G03D 3/08; G03B 27/52

[52] U.S. Cl. ............................ 396/567; 396/615; 355/27

[58] Field of Search ................................ 355/27–29, 68, 355/77; 396/599, 612, 615, 567–570

[56] References Cited

U.S. PATENT DOCUMENTS

| | | | |
|---|---|---|---|
| 3,776,119 | 12/1973 | Slingsby et al. | 396/582 |
| 3,873,988 | 3/1975 | Pfeifer et al. | 396/622 |
| 4,218,123 | 8/1980 | Viehrig et al. | 396/594 |
| 4,362,376 | 12/1982 | Otani | 396/615 |
| 4,363,548 | 12/1982 | Oberhoffner et al. | 396/568 |
| 4,406,534 | 9/1983 | Viehrig et al. | 396/612 |
| 4,555,632 | 11/1985 | Vockenhuber | 250/599.02 |
| 4,719,483 | 1/1988 | Yamazaki | 396/594 |
| 4,742,216 | 5/1988 | Morse et al. | 396/595 |
| 4,743,928 | 5/1988 | Young | 396/594 |
| 4,760,417 | 7/1988 | Zwettler et al. | 396/620 |
| 4,843,430 | 6/1989 | Huber et al. | 396/599 |
| 4,967,222 | 10/1990 | Nitsch | 396/616 |
| 5,373,338 | 12/1994 | Yamaguchi et al. | 396/612 |
| 5,434,643 | 7/1995 | Ishikawa et al. | 355/27 |
| 5,555,066 | 9/1996 | Benker | 396/613 |
| 5,864,728 | 1/1999 | Earle et al. | 396/615 |
| 5,943,121 | 8/1999 | Patton et al. | 396/612 |

FOREIGN PATENT DOCUMENTS

| | | |
|---|---|---|
| 3014784 | 12/1984 | Germany . |
| 4033367 | 4/1992 | Germany . |
| 502014 | 3/1939 | United Kingdom . |
| 867055 | 5/1961 | United Kingdom . |
| 1367443 | 9/1974 | United Kingdom . |
| 2041567 | 9/1980 | United Kingdom . |

*Primary Examiner*—D. Rutledge
*Attorney, Agent, or Firm*—Frank Pincelli

[57] ABSTRACT

A photographic processing method and apparatus. The apparatus includes a processor for developing an exposed photographic paper, a first entry point into the processor for transferring of the exposed photographic paper to the main processing path of the processor, and a second entry point into the processor to receive a photosensitive material of a second format different from the first format and leading the photosensitive material to the main processing path. An adapter is provided having a first end which is arranged to mate with a cassette in a light-tight manner having a second end which is connectable in a light-tight manner with the second entry point on the processor. The cassette contains a photosensitive material of a second format and the cassette may be fed directly into the processor via the adapter and the second entry point of the processor. A sensor is provided for monitoring the amount of photosensitive material passing through the second entry point and for controlling the amount of replenishment of processing chemicals to the processor in response to the amount of photosensitive material monitored.

9 Claims, 3 Drawing Sheets

KIT FOR USE WITH A PHOTOGRAPHIC PROCESSOR

CROSS REFERENCE TO RELATED APPLICATIONS

This application is related to now U.S. Pat. No. 5,864,728, entitled AN ADAPTER FOR USE WITH A PHOTOGRAPHIC PROCESSING APPARATUS, of Anthony Earle and John H. Rosenburgh; and to U.S. Ser. No. 09/013,555, filed Jan. 26, 1998, now U.S. Pat. No. 5,943,121, of David L. Patton, Alan K. Tsaur, Ralph L. Piccinino, Jr., Jerry Carmen and Kevin Blakely.

FIELD OF THE INVENTION

The present invention relates to an adapter for use with a photographic processing apparatus as well as a processing method and a kit for modifying the processor. The adapter is designed to interface through a pre-existing slot on the processing apparatus, which is normally designed to receive control strips and other similar type items.

BACKGROUND OF THE INVENTION

One type of photographic processing assembly is known as a minilab. A typical minilab has three sections. The first section is a printer where negatives are exposed to photographic paper to record latent images on that paper. The exposed photographic paper is then fed into the second section, or processor. In the processor, the paper is treated with processing chemicals to develop the latent images so as to produce stable prints. The stable prints are then fed to the third section of the minilab, the dryer, where excess moisture is removed from the prints. As the exposed paper is being developed in the processor, the processing chemicals are consumed and have to be replenished. Sensors in the minilab monitor the amount of photographic paper that is processed through the normal processing path of the minilab and appropriate replenishment of the processing chemical solutions.

One of the major advantages of a minilab of the type described above is its simplicity of use. Essentially, provided that the machine is set up correctly and operating correctly, all an operator needs to do is feed photographic negatives into the printer and remove finished prints from the dryer. The operator does not need to handle anything other than the negatives and the finished prints. The processing of the negatives into prints can be highly automated allowing relatively unskilled operators to work the machine. This advantage, however, is in some respects a disadvantage. A minilab lacks flexibility, since it is dedicated to producing prints from photographic negatives and cannot be used to produce prints from other sources such as a photo-CD or an electronic camera.

The above-noted copending U.S. Pat. No. 5,864,215 addresses this drawback by providing for an adapter that allows an existing minilab to accept paper from other printing devices without having to make any modifications to the minilab. This adapter allows a roll or web of exposed photographic paper to be fed from a cassette or magazine directly onto the processor via an alternate entry to the processor which is separate from an entry to the printer. This processor entry can be the test strip feed slot of the processor. The paper stored in the cassette of U.S. Pat. No. 5,864,215 may have been exposed to images from various sources such has photo-CDs, or an electronic camera, using a device such as a Kodak CRT Color Digital Printer. Because the adapter of this application utilizes the processor entry point, which can be a test strip feed slot, no adjustments have to be made to the printer of the minilab.

However, a drawback to the arrangement disclosed in U.S. Pat. No. 5,864,215 is that since the alternate feed slot is utilized, normal operation of the processor is prevented. As a result, normal sensors which obtain information on paper, such as paper size and/or width, and assure the correct paper is being fed, also provide appropriate information for controlling replenishment based on the information obtained from the photographic paper passing through the normal processing path. Utilizing the alternate feed slot avoids obtaining this information.

It is disclosed in U.S. Pat. No. 5,943,121 to utilize an adapter designed for placement with the normal feed slot, allowing different size photosensitive materials to be utilized with the device. However, a drawback with this arrangement is that the photosensitive material must pass through the entire printing section and the printer must be disabled, which otherwise could adversely affect the photosensitive material passing there through. Thus, there exists a need for providing a method and apparatus which allows use of the alternate feed slot while still obtaining the desired information required for maintaining appropriate operation of the processor, and in particular, to continue to provide the proper replenishment to the processing solution being utilized.

SUMMARY OF THE INVENTION

The present invention is directed to solving the problems of the prior art in that the present invention allows the utilization of various size photosensitive material to be fed in through the alternate feed slot of an apparatus while still obtaining the required information so that the appropriate replenishment of the processing solution and other operations of the apparatus are performed.

In accordance with one aspect of the present invention, there is provided a photographic processing apparatus comprising:

- a printer for exposing photographic negatives to photographic paper of a first format;
- a processor for developing the exposed photographic paper;
- a first entry point into the processor for transferring of the exposed photographic paper from the printer to a processing path of the processor;
- a second entry point into the processor to receive a photosensitive material of a second format different from the first format and leading the photosensitive material to the processing path;
- an adapter having a first end which is arranged to mate with a cassette in a light-tight manner, said adapter having a second end which is connectable in a light-tight manner with the second entry point on the processor, said cassette containing the photosensitive material of the second format and the cassette may be fed directly into the processor via the adapter and the second entry point of the processor; and
- a sensor for monitoring the amount of photosensitive material passing through said second entry point and for controlling the amount of replenishment of processing chemicals to the processor in response to the amount of photosensitive material monitored.

In accordance with another aspect of the present invention, there is provided a method of using a photographic processing apparatus having a processor for developing photosensitive material and first and second entry points into the processor, said first and second entry points feeding said photosensitive material to a single processing path, said first entry point being designed to receive a photosensitive material of a first format for processing the photosensitive material of the first format, the method comprising the steps of:

exposing a web of photosensitive material to record a latent image, or series of latent images, and storing the web of photosensitive material in a cassette, said cassette containing said web of photosensitive material having a second format different from said first format;

connecting the cassette to the second entry point of the developing section via an adapter;

feeding the web of exposed photosensitive material from the cassette through the adapter into the processor to develop the latent image, or series of latent images;

monitoring the amount of photosensitive material being fed from said cassette; and replenishing the processing solution in the processor in accordance with the amount of photosensitive material being processed from said cassette.

In accordance yet with another aspect of the present invention, there is provided a kit for use with a photographic processing apparatus having a processor for developing photosensitive material and first and second entry points for feeding photosensitive material into said processor, said first and second entry points feeding said photosensitive material to a single processing path of said processor, said first entry point being designed to receive the photosensitive material of a first format for processing of the photosensitive material of the first format, the kit comprising:

an adapter having a first end which is configured to mate with a cassette in a light-tight manner, said cassette containing a photosensitive material of a second format different from said first format, and a second end which is configured to mate in a light-tight manner with the second entry point of the processor, and a passage for allowing photosensitive material to pass through the adapter between the first and second ends; and means for modifying said photographic processing apparatus such that the amount of replenishment solution provided to said processor is provided in accordance with the amount of photosensitive material being passed through said second entry point.

In accordance yet with another aspect of the present invention, there is provided a processing apparatus comprising:

a printer which exposes photographic negatives to photographic paper;

a processor which develops the exposed photographic paper;

a sensor for sensing a marking placed on said photographic paper and for cutting said photographic paper in response to said marking; and an adapter having a feed slot, the first side of said feed slot mating with an entrance to said processor and a second side of the feed slot mating with an opening on a cassette mounted on the adapter, the cassette containing the photosensitive material wherein the feed slot forms a passage for the photosensitive material from the cassette to the processor, said photosensitive materials being provided from said cassette having markings which may be read by said means for sensing a marking for cutting of the photosensitive material after developing.

In accordance yet with another aspect of the present invention, there is provided a method of using a photographic processing apparatus designed for use with a photosensitive material of a first format so that the photographic processing apparatus can be used to process a photographic material of a second format different from said first format, said processing apparatus having a printer for exposing photographic negatives to photographic material of said first format; a processor for developing photosensitive material and first and second entry points into the processor, said first and second entry points feeding said photosensitive material to a single processing path, said first entry point being designed to receive and process the photosensitive material of said first format, said second entry point being designed to receive the photosensitive material of said second format, a sensor for sensing a marking placed on said photographic material of said first and second format and for cutting said photographic material in response to said marking, the method comprising the steps of:

exposing a web of photosensitive material to record a latent image, or series of latent images, and storing the web of photosensitive material in a cassette, said cassette containing said web of photosensitive material of said second format, said web of photosensitive material of said second format having markings thereon for indicating where said web is to be cut;

connecting the cassette to the second entry point of the developing section via an adapter;

feeding the web of exposed photosensitive material from the cassette through the adapter into the processor to develop the latent image, or series of latent images; and sensing said marking on said web using said sensor and cutting said web said in response to said markings.

In accordance still with another aspect of the present invention, there is provided a method of modifying a photographic processing apparatus designed for use with a photosensitive material of a first format so that photographic processing apparatus can be used to process a photographic material of a second format different from said first format, said processing apparatus having a printer for exposing photographic negatives to photographic material of said first format; a processor for developing photosensitive material and first and second entry points into the processor, said first and second entry points feeding said photosensitive material to a single processing path, said first entry point being designed to receive and process the photosensitive material of said first format, said second entry being designed to receive the photosensitive material of said second format, a sensor for sensing a marking placed on said photographic material of said first and second format and for cutting said photographic material in response to said marking, the method comprising the steps of:

providing an adapter having a first end which is configured to mate with a cassette in a light-tight manner, said cassette containing a photosensitive material of a second format different from said first format, and a second end which is configured to mate in a light-tight manner with the second entry point of the processor, and a passage for allowing photosensitive material to pass through the adapter between the first and second ends; and modifying said photographic processing apparatus such that the amount of replenishment solution provided to said processor is provided in accordance with the amount of photosensitive material being passed through said second entry point.

The above, and other objects, advantages and novel features of the present invention will become more apparent from the accompanying detailed description thereof when considered in conjunction with the following drawings.

BRIEF DESCRIPTION OF THE DRAWINGS

In the detailed description of the preferred embodiments of the invention presented below, reference is made to the accompanying drawings in which.

DETAILED DESCRIPTION OF THE INVENTION

The present description will be directed in particular to elements forming part of, or in cooperation more directly with, the apparatus in accordance with the present invention. It is understood that elements not specifically shown or described may take various forms well known to those skilled in the art.

Figure 1:
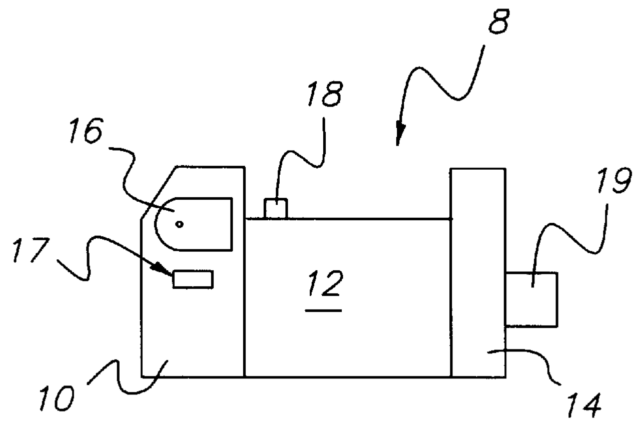
FIG. 1 is a schematic illustration of a minilab incorporating the present invention.

Referring to the drawings, FIG. 1 shows a typical minilab 8 having three sections, a printer 10, a processor 12 and a dryer 14. The printer 10 houses a cassette 16 which contains a roll or web of unexposed photographic paper (not shown). Photographic negatives which are used to record latent images on the photographic paper are fed into the printer at print gate 17. After the photographic paper has been exposed to the negatives, it is fed into the processor 12 where the latent images recorded on the photographic paper are developed. The processed prints are fed into the third stage of the minilab, the dryer 14, where excess moisture is removed from the prints. Finished prints 19 are then fed out of the dryer 14. The processor 12 includes a test strip feed slot 18, which allows test strips to be fed into the processor to test whether the correct balance of processing chemicals is present in the processor.

Figure 2:
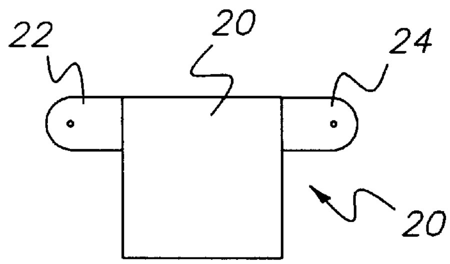
FIG. 2 is a schematic illustration of a printing device including a cassette containing exposed photographic paper.

FIG. 2 shows an alternate printing device 20 for exposing an exposed photographic paper. The printing device 20 feeds unexposed paper from a cassette 22, exposes the paper to record a latent image on it and then stores the exposed paper in a second cassette 24. The cassettes 22 and 24 are identical in design and can be the same as that used in the minilab. Printing device 20 may comprise any desired type of device used to record images from any suitable source onto photographic paper in cassette 22. For example, scanned images, digital images, optical images, photo-CD images and images from electronic cameras may all be transferred to the photographic paper by device 20.

Figure 3:
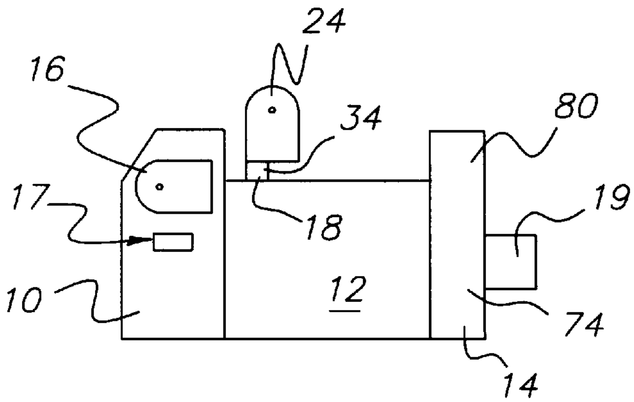
FIG. 3 is a schematic illustration of the cassette from the exposure station of FIG. 2 being fed into a minilab utilizing an adapter made in accordance with the present invention.

Once an image has been recorded onto photographic paper and stored in cassette 24, the cassette 24 is removed from the device 20 and transferred to the test strip feed slot 18 of the minilab through the adapter 34, as shown in FIG. 3.

Figure 4:
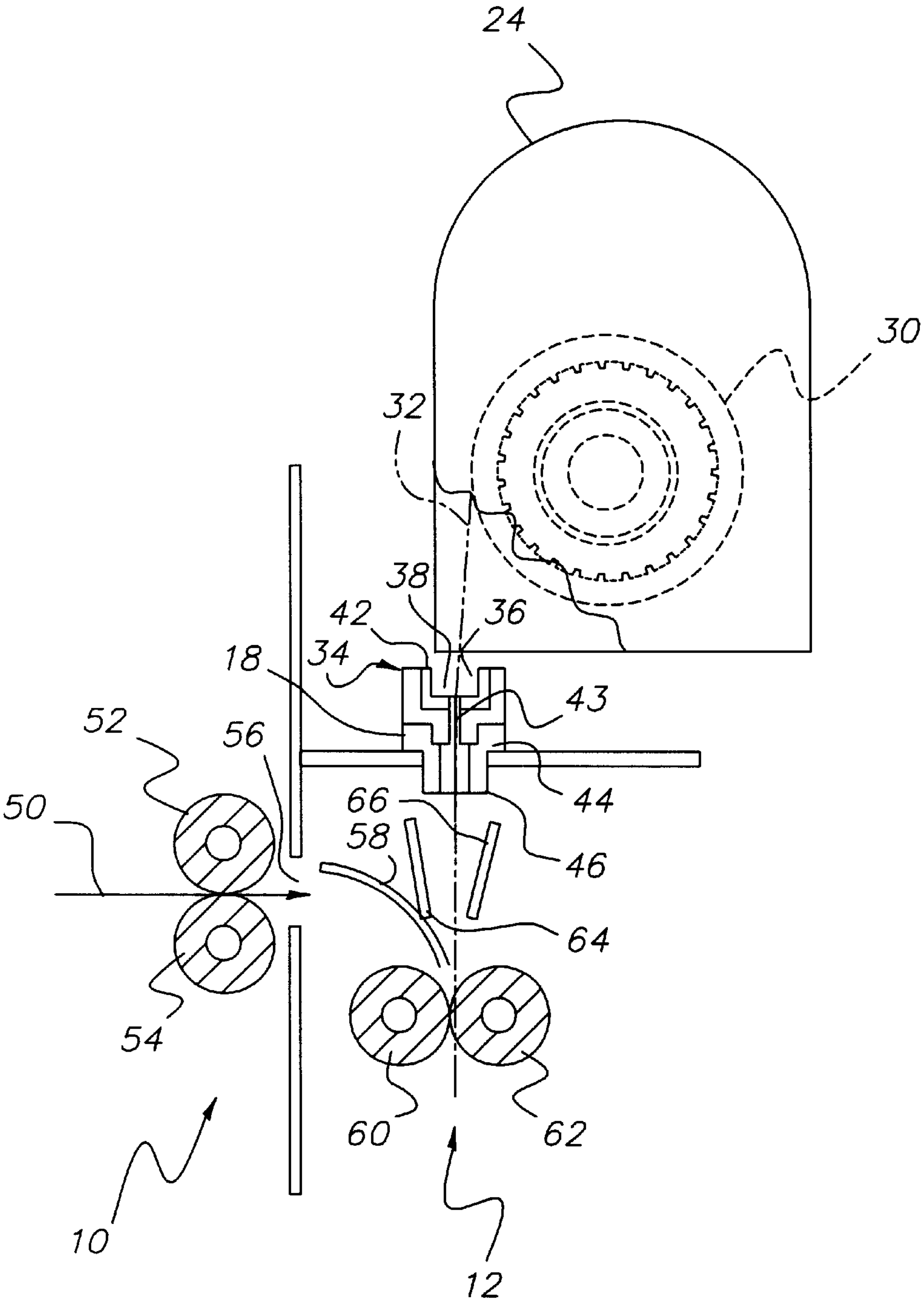
FIG. 4 is a partial cross-sectional view through the cassette, adapter, and minilab of FIG. 3.

FIG. 4 shows the arrangement in more detail. The cassette 24 contains a roll, or web 30, of exposed photographic paper. Dotted line 32 shows paper passing from the cassette 24 into the processor 12 of the minilab via the adapter 34. In the preferred embodiment illustrated, adapter 34 is of two piece construction, generally of an appropriate plastic material so that it can be easily and economically produced. One end of the cassette 24 defines an elongate protrusion 36 which has a slot 38 through which paper can pass. That protrusion 36 mates with a corresponding recess 40 in one end of the adapter 34. The recess 40 is lined with velvet plush material 42 to ensure that the connection between adapter 34 and cassette 24 is light-tight. The center of the adapter defines a slot 43 which allows paper to pass through the adapter 34. The other end of the adapter 34 defines an elongate protrusion 44, which is arranged to mate with the test strip feed slot 18 in a light-tight manner. The test strip feed slot 18 is light-tight at 46.

FIG. 4 also shows other features of the printer and processor sections 10, 12 of the minilab 8 itself. Paper 50 which has been exposed to negatives in printer 10 is fed via drive rollers 52, 54 into the processor 12 via the first entry point 56 to the processor 12 as is typically done in the prior art. A guide 58 then guides the paper to the first pair of drive rollers 60, 62 of the processor 12 where it is processed in the typical manner. A pair of further guides 64, 66 are positioned beneath the test strip entry slot 18. Guides 64, 66 are typically used to guide test strips to the drive rollers 60, 62 in minilab 8. In the present invention, guides 64, 66 also serve to guide exposed paper from cassette 24 to those same rollers 60, 62. The paper then passes into processor 12 in the same manner as paper from printer 10. None of these features require any adjustment to allow paper to be fed into the processor via the test strip feed slot.

Figure 5:
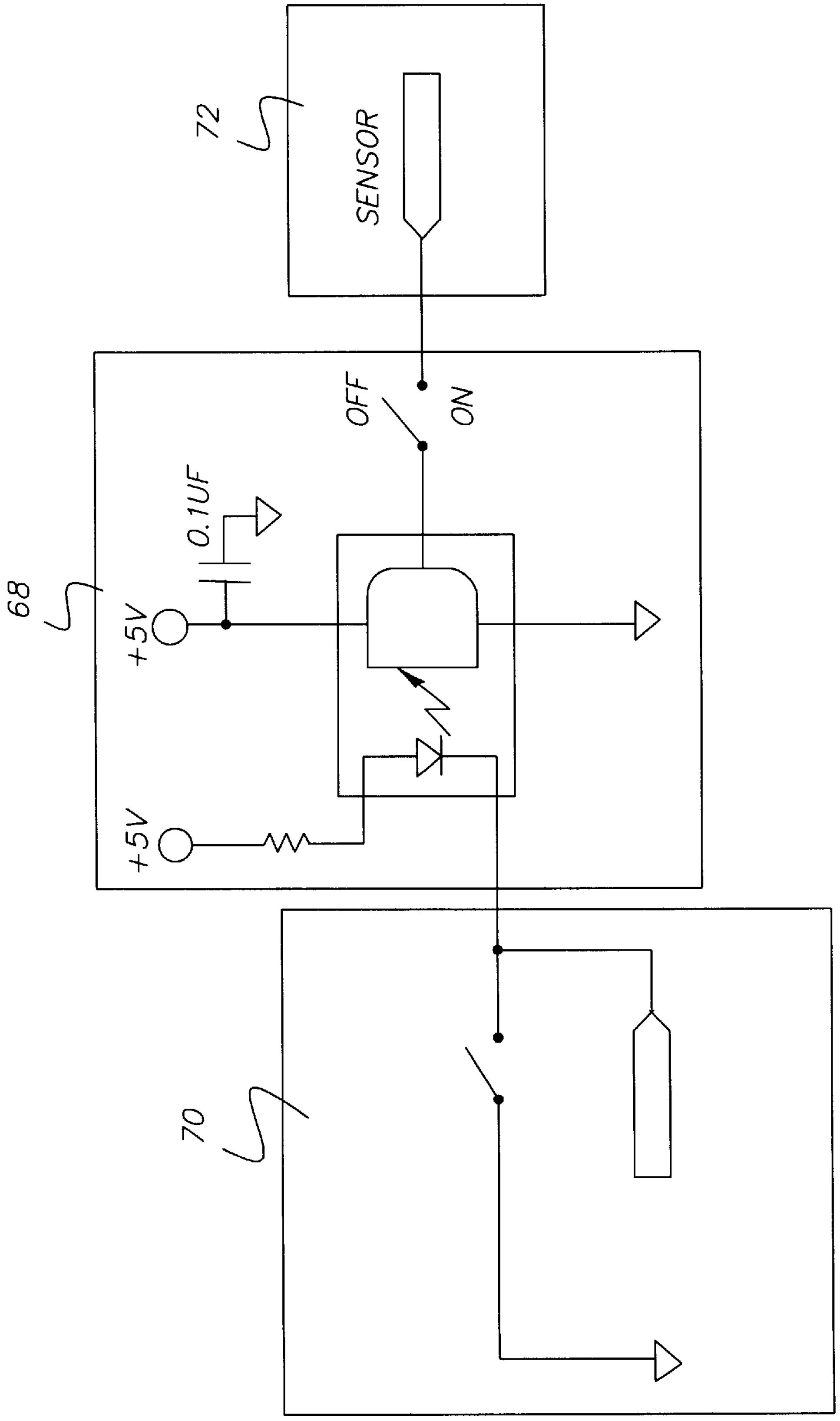
FIG. 5 is a schematic illustration of a modification made to the minilab of FIGS. 1 and 4.

As is typical with most minilabs, means are provided for monitoring the amount of photosensitive material passing through the print gate 17. This information is typically used for determining the appropriate amount of replenishment solution required for replenishing of the chemicals within the processing tank. However, in typical prior art devices, there is no means for monitoring the amount of photosensitive material being fed through the test strip feed slot 18. In accordance with the present invention, there is provided means for monitoring the amount of photosensitive material passing through the test strip feed slot 18. This can take any manner that is conventionally done in the prior art, for example, having appropriate sensors for measuring the size of the photosensitive material passing through and knowing the rate at which the photosensitive material is passed there through. The appropriate information can then be calculated for determining the amount of replenishment solution as is typically done in the prior art. Applicants have found that the standard sensors already present can be utilized in certain processors. For example, in a Noritsu QSS/1202 minilab, the amount of processing material passing through the feed slot 18 can be monitored by placing a wiring circuit which connects the limit switch in the processor to the ready sensor in the printer. This allows the apparatus to monitor the amount of processing material passing through as is typically done with sensors already present. FIG. 5 illustrates how this wiring circuit is accomplished. In particular, a circuit 68 is added for connecting limit switch 70 to ready sensor 72, already existent in the printer. Sensor 72 is used to monitor the amount of photosensitive material passing through the apparatus during normal operation, that is, fed through the normal entry point. Thus, by this simple procedure, the apparatus now can be operated with an auxiliary cassette for feeding alternate format photosensitive material through the feed slot while still monitoring the amount of photosensitive material being passed through the processing section and replenishing the photosensitive chemicals as is typically done during normal operation.

In order to continue to use the apparatus in normal mode, it is desirable that the web 30 of cassette 22 be provided with appropriate punch marks indicating where individual images are placed and where customer orders begin and end. In typical minilabs, such as the Noritsu QSS/1202, means are provided for marking of the images during printing for identifying the location of the image in customer orders. By providing the roll of web 30 with the appropriate punch marks, the apparatus can be operated in its normal manner such that the individual prints and orders are segregated as is typically done by such devices. Sensor 80, which is used during normal operation, senses the marks provided on the web 30 (photosensitive material), which are used to appropriately cut the web 30, by cutter 74, in the desired locations indicated by the marks.

Thus, the present invention provides a means for operating a device such that it is capable of receiving more than one type/format photosensitive material and still operate in its normal intended form by simple modification. If desirable, modifications may be provided in a kit form whereby the appropriate components are provided for modifying of the apparatus such that the appropriate sensing and use thereof can be conducted as described herein.

The invention has been described in detail with particular reference to certain preferred embodiments thereof, but it will be understood that variations and modifications can be effected within the scope of the invention.

PARTS LIST

| | |
|---|---|
| 8 | Minilab |
| 10 | Printer |
| 12 | Processor |
| 14 | Dryer |
| 16 | Cassette |
| 17 | Print gate |
| 18 | Feed slot |
| 19 | Finished prints |
| 20 | Printing device |
| 22 | Cassette |
| 24 | Cassette |
| 30 | Web |
| 32 | Dotted line |
| 34 | Adapter |
| 36 | Protrusion |
| 38 | Slot |
| 40 | Recess |
| 42 | Plush material |
| 43 | Slot |
| 44 | Protrusion |
| 46 | Light-tight |
| 50 | Paper |
| 52 | Drive rollers |
| 54 | Drive rollers |
| 56 | Entry point |
| 58 | Guide |
| 60 | Drive rollers |
| 62 | Drive rollers |
| 64 | Guides |
| 66 | Guides |
| 68 | Wiring Circuit |
| 70 | Limit switch |
| 72 | Ready sensor |
| 74 | Cutter |
| 80 | Sensor |

What is claimed is:

1. A photographic processing apparatus comprising:

a printer for exposing photographic negatives to photographic paper of a first format;

a processor for developing the exposed photographic paper;

a first entry point into the processor for transferring of the exposed photographic paper from the printer to a processing path of the processor;

a second entry point into the processor to receive a photosensitive material of a second format different from the first format and leading the photosensitive material to the processing path;

an adapter having a first end which is arranged to mate with a cassette in a light-tight manner, said adapter having a second end which is connectable in a light-tight manner with the second entry point on the processor, said cassette containing the photosensitive material of the second format and the cassette may be fed directly into the processor via the adapter and the second entry point of the processor; and a sensor for monitoring the amount of photosensitive material passing through said first and second entry points and for controlling the amount of replenishment of processing chemicals to the processor in response to the amount of photosensitive material monitored.

2. A method of using a photographic processing apparatus having a processor for developing photosensitive material and first and second entry points into the processor, said first and second entry points feeding said photosensitive material to a single processing path, said first entry point being designed to receive a photosensitive material of a first format for processing the photosensitive material of the first format, the method comprising the steps of:

exposing a web of photosensitive material to record a latent image, or series of latent images, and storing the web of photosensitive material in a cassette, said cassette containing said web of photosensitive material having a second format different from said first format;

connecting the cassette to the second entry point of the developing section via an adapter;

feeding the web of exposed photosensitive material from the cassette through the adapter into the processor to develop the latent image, or series of latent images;

monitoring the amount of photosensitive material being fed from said cassette; and replenishing the processing solution in the processor in accordance with the amount of photosensitive material being processed from said cassette.

3. A kit for use with a photographic processing apparatus having a processor for developing photosensitive material and first and second entry points for feeding photosensitive material into said processor, said first and second entry points feeding said photosensitive material to a single processing path of said processor, said first entry point being designed to receive the photosensitive material of a first format for processing of the photosensitive material of the first format, the kit comprising:

an adapter having a first end which is configured to mate with a cassette in a light-tight manner, said cassette containing a photosensitive material of a second format different from said first format, and a second end which is configured to mate in a light-tight manner with the second entry point of the processor, and a passage for allowing photosensitive material to pass through the adapter between the first and second ends; and a wiring circuit and switch for modifying said photographic processing apparatus such that the amount of replenishment solution provided to said processor is provided in accordance with the amount of photosensitive material being passed through said second entry point.

4. A processing apparatus comprising:

a printer which exposes photographic negatives to photographic paper;

a processor which develops the exposed photographic paper;

a sensor for sensing a marking placed on said photographic paper and for cutting said photographic paper in response to said marking; and an adapter having a feed slot, first side of said feed slot mating with an entrance to said printer and a second side of the feed slot mating with an opening on a cassette mounted on the adapter, the cassette containing the photosensitive material wherein the feed slot forms a passage for the photosensitive material from the cassette to the printer; said photosensitive materials being provided from said cassette having markings which may be read by said means for sensing a marking for cutting of the photosensitive material after developing.

5. The apparatus according to claim 4 wherein said marking comprises a hole provided in said photographic paper.

6. A method of using a photographic processing apparatus designed for use with a photosensitive material of a first format so that the photographic processing apparatus can be used to process a photographic material of a second format different from said first format, said processing apparatus having a printer for exposing photographic negatives to photographic material of said first format; a processor for developing photosensitive material and first and second entry points into the processor, said first and second entry points feeding said photosensitive material to a single processing path, said first entry point being designed to receive and process the photosensitive material of said first format, said second entry being designed to receive the photosensitive material of said second format, means for sensing a marking placed on said photographic material of said first and second format and for cutting said photographic material in response to said marking, the method comprising the steps of:

exposing a web of photosensitive material to record a latent image, or series of latent images, and storing the web of photosensitive material in a cassette, said cassette containing said web of photosensitive material of said second format, said web of photosensitive material of said second format having markings thereon for indicating where said web is to be cut;

connecting the cassette to the second entry point of the developing section via an adapter;

feeding the web of exposed photosensitive material from the cassette through the adapter into the processor to develop the latent image, or series of latent images; and sensing said marking on said web using said sensor and cutting said web said in response to said markings.

7. A method of modifying a photographic processing apparatus designed for use with a photosensitive material of first format so that the photographic processing apparatus can be used to process a photographic material of a second format different from said first format, said processing apparatus having a printer for exposing photographic negatives to photographic material of said first format; a processor for developing photosensitive material and a first and second entry points into the processor, said first and second entry points feeding said photosensitive material to a single processing path, said first entry point being designed to receive and process the photosensitive material of said first format, said second entry being designed to receive the photosensitive material of said second format, means for sensing a marking placed on said photographic material of said first and second format and for cutting said photographic material in response to said marking, the method comprising the steps of:

providing an adapter having a first end which is configured to mate with a cassette in a light-tight manner, said cassette containing a photosensitive material of a second format different from said first format, and a second end which is configured to mate in a light-tight manner with the second entry point of the processor, and a passage for allowing photosensitive material to pass through the adapter between the first and second ends; and modifying said photographic processing apparatus such that the amount of replenishment solution provided to said processor is provided in accordance with the amount of photosensitive material being passed through said first and second entry points.

8. The method according to claim 7 further comprising the step of:

modifying the apparatus such that the means for monitoring marking on said web of photosensitive material on photographic material of said second format and cutting web in accordance with said markings is active when said adapter is in use.

9. A photographic processing apparatus comprising:

a processor for developing an exposed photographic material;

a first entry point into the processor for receiving the exposed photographic material of a first format and forwarding the exposed photosensitive paper to a main processing path;

a second entry point into the processor to receive a photosensitive material of a second format different from the first format and leading the photosensitive material to the main processing path;

an adapter having a first end which is arranged to mate with a cassette in a light-tight manner, said adapter having a second end which is connectable in a light-tight manner with the second entry point on the processor, said cassette containing the photosensitive material of the second format and the cassette may be fed directly into the processor via the adapter and the second entry point of the processor; and a sensor for monitoring the amount of photosensitive material passing through said first and second entry points and for controlling the amount of replenishment of processing chemicals to the processor in response to the amount of photosensitive material monitored.

* * * * *